United States Patent [19]

Green

[11] Patent Number: 4,842,381

[45] Date of Patent: * Jun. 27, 1989

[54] ELECTROCHROMIC DATA RECORDING SYSTEMS

[75] Inventor: Mino Green, London, England

[73] Assignee: National Research Development Corp., London, England

[*] Notice: The portion of the term of this patent subsequent to Mar. 1, 2005 has been disclaimed.

[21] Appl. No.: 130,458

[22] PCT Filed: Mar. 17, 1987

[86] PCT No.: PCT/GB87/00185

§ 371 Date: Nov. 17, 1987

§ 102(e) Date: Nov. 17, 1987

[87] PCT Pub. No.: WO87/05737

PCT Pub. Date: Sep. 24, 1987

[30] Foreign Application Priority Data

Mar. 18, 1986 [GB] United Kingdom ............... 8606651

[51] Int. Cl.$^4$ ............................ G02F 1/01; G02F 1/17
[52] U.S. Cl. ..................................... 350/357; 369/275; 369/284
[58] Field of Search ................ 350/357; 369/275, 283, 369/284

[56] References Cited

U.S. PATENT DOCUMENTS 4,075,610 2/1978 Crandall et al. .................... 365/107
4,728,177 3/1988 Green ................................. 350/357

FOREIGN PATENT DOCUMENTS 2142494 1/1985 United Kingdom .

OTHER PUBLICATIONS

Kazan, "Photochromic Disk File", IBM Technical Disclosure Bulletin, vol. 14, No. 5, Oct. 1971.

Primary Examiner—Eugene R. Laroche
Assistant Examiner—Nathan W. McCutcheon
Attorney, Agent, or Firm—Cushman, Darby & Cushman

[57] ABSTRACT

An electrochromic data recording device such as a disc including at least one electrochromic zone (4) in and as a part of an electrical cell (2, 4, 5, 6, 7) for selectively supplying and withdrawing guest atoms to and from the zone to produce an optical change in the zone, the cell being substantially inoperable at a first temperature but being operable at a temperature elevated with respect to the first temperature by virtue of the mobility of current carrying ions in a component of the cell which are appropriately temperature dependent. The device can be written on by laser heating the device locally to allow current to pass to produce a local optical effect and can be read by a laser and photodector in combination. Further, the device can be erased by being heated sufficiently to become conductive.

21 Claims, 1 Drawing Sheet

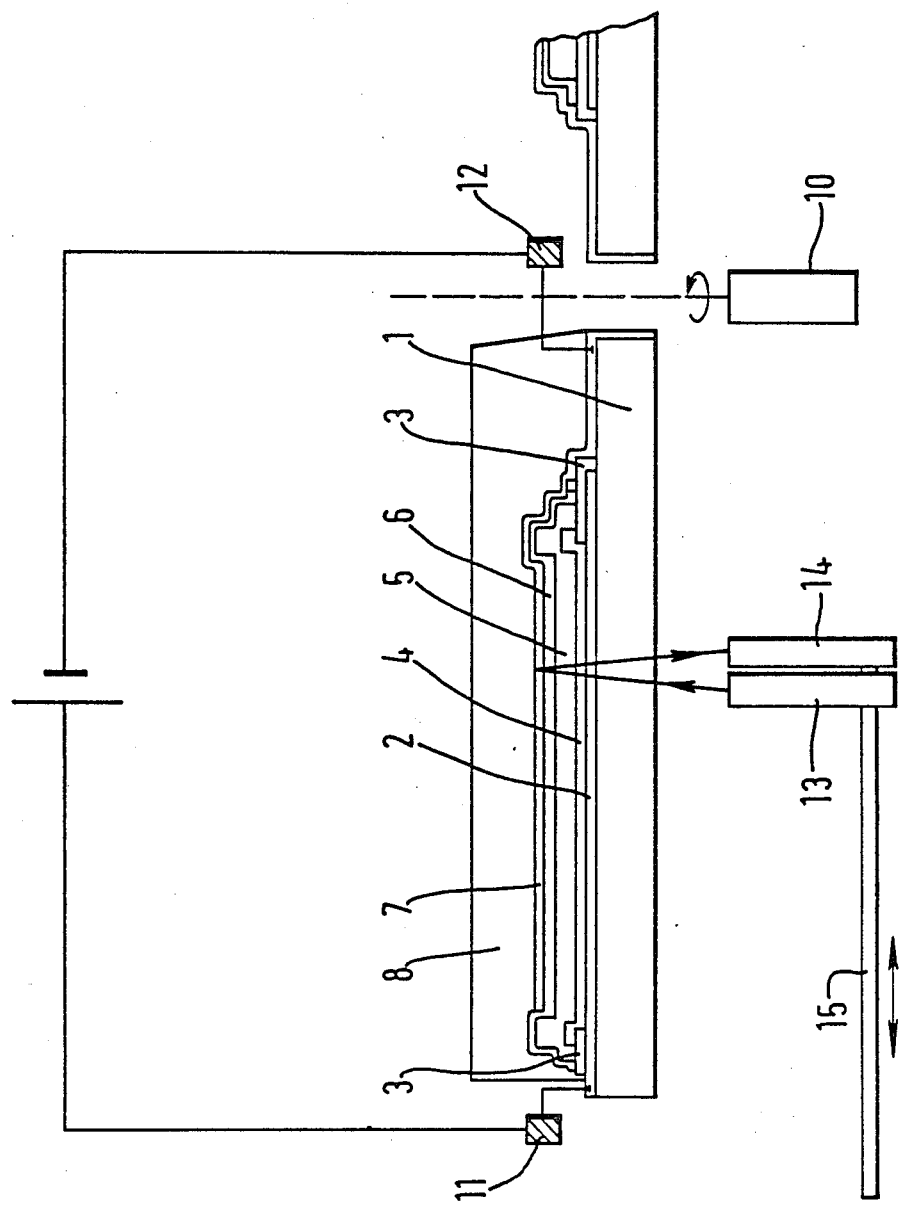

ELECTROCHROMIC DATA RECORDING SYSTEMS

The present invention relates to electrochromic data recording systems and has particular relevance to discs for recording digital data such as audio visual data.

Audio visual data can presently be recorded by a disc manufacturer on video discs and compact discs. It is a disadvantage of present video and compact disc systems that the digital optical information representing the video and audio material is fixed in the disc and cannot be altered after manufacture.

The laser video disc system has been fully described in the literature and is the subject of two recent books (one of these is "Principles of Optical Disc Systems", by G. Bouwhuis et al, Adam Hilger Ltd, 1985). The discs on which the digital optical information is stored, called video discs, are normally made from a master disc (cf. gramophone records). Some video disc systems however have an on-line optical recording facility, cf. magnetic discs. Writing involves running the laser at higher power levels and having a disc made of a suitable arrangement of materials so as to accept recording and give good reading properties. In such a system no mastering would be done. So far all the disc arrangements, herein called "disc stacks", involve thermal processes. Thus in one arrangement the recording material is a tellurium-selenium alloy thin film in which a hole is "burnt". Another arrangement involves bubble formation in a polymer film, and yet another depends upon thermally induced magneto-optic effects. There is a need for a disc stack on which the digital information can be written and subsequently erased and then rewritten, many times.

In British Patent Application No. 2164466 (published after the priority date hereof) there is described an electrochromic material in which a colour change, which may be in the visible range, may be made by the passage of an electric current only when the electrochromic material is at a suitably high temperature.

In United Kingdom Patent Application No. 2164170A there is disclosed an electrochromic material having two host layers each of which can receive and give up guest atoms. The optical density of at least one of these layers at some frequency of light is varied by the concentration of guest atoms. The colouration need not necessarily be in the visible spectrum. The two layers are coloured to different extents by the presence of the same amount of the same guest metal atom and indeed one layer may be scarcely affected or unaffected and this is used as the basis for varying the optical density of devices containing the said layers by driving guest atoms between the layers by passage of electric current.

It has now been discovered that it is possible to produce an electrochromic data recording device, preferably in the form of a disc, comprising means defining an axis of rotation a data recording portion surrounding the said axis, at least one electrochromic zone in said recording portion and means for selectively supplying to and withdrawing from said zone guest atoms which produce an optical change in said zone, which means is substantially inoperable at room temperature but is operable at an elevated temperature. The elevated temperature may be produced locally in the device by a laser to encode data in the device.

The invention relates not only to devices of this kind but also to apparatus for writing information into or erasing information from a device such as a disc according to the invention comprising means for supporting a recording device, means for applying a general electrical potential difference across the device over a recording area of the device, and a laser for selectively applying light energy to individual locations in the recording area to heat the device at said locations.

Means may be included for general heating of the device also. Such means may be controllable to heat the device selectively to (1) a lower temperature at which it is not conducting, and (2) a higher temperature at which it is conducting for erasure.

Means may be provided for heating selected zones of the device for partial erasure of the device.

Means may be provided for rotating a recording device supported on said support means in use to bring a succession of locations into the light path of said laser.

Means may be provided for scanning the light path of said laser over a range of locations on a recording device on said support means in use. This may involve movement of the laser with respect to the device. Where the device rotates (as in the case of a disc) the laser may be scanned along a radius of the rotation. The device may be stationary and the laser scanned in two dimensions to move over the surface of the device.

The laser itself may remain stationary whilst optical means deflect the beam thereof in one or in two dimensions to scan the recording device.

For playback, a photoelectric detector may be provided to detect light from the laser reflected from or transmitted through the device and the detector may be scanned with respect to the device in synchrony with the laser.

The invention also includes a method of writing a data recording device by subjecting regions on said device to a laser beam to heat the device locally to alter the optical properties thereof characterised in that the device comprises at least one electrochromic zone and means responsive to applied electrical potential for supplying to and withdrawing from said zone guest atoms which produce an optical change in said zone, which means is substantially inoperable at a first temperature but is operable at a temperature elevated with respect to the first temperature, and said method comprises applying an electrical potential to said device tending to supply guest atoms to or withdraw guest atoms from said zone whilst said device as a whole is at a temperature such that the said means is not operable, whilst subjecting regions on said device to the laser beam to heat the device locally at said regions to render said means locally operable to bring about a change in guest atom content of the electrochromic zone in response to said applied potential. Preferably, the device comprises a multilayer structure providing a reflective backing layer and at least two layers capable of acting as host layers to guest atoms separated by a layer of solid electrolyte.

One of said layers capable of acting as a host layer for the guest atoms is preferably substantially transparent to the laser light during use of the device whilst the other said layer preferably is of variable optical density at the laser frequency and thus can be changed from a state in which it is substantially transparent to the laser light by movement of said guest atoms to and from the said variable optical density layer.

The frequency at which the change in optical density is greatest preferably is matched reasonably closely to the laser frequency and need not be in the visible range. Thus no visible change in colour need be involved but by a suitable choice of operating frequency and materials, visible colour changes can result.

In outline, in preferred embodiments of the invention, a solid state electrochromic electrochemical cell is made which is completely inactive at, or near, room temperature, but which on being heated can then be written or erased. In essence the laser light absorbed in an electrochromic layer heats it and the local electrochemical cell, so that diffusion of guest atoms in both host materials can occur and the electrolyte is conducting. An electric potential is applied to the cell so that when local laser heating occurs material is electrochemically transferred from an optically absorbing upper layer to a transparent or reflecting lower layer, thus bleaching local areas of the upper layer. Less advantageously the layer which changes optical density to record data can be beneath a transparent (at the laser frequency) guest atom accepting upper layer.

The invention will be illustrated with reference to the accompanying drawings in which:

FIG. 1 shows in schematic cross-section a disc for digital recording according to the invention mounted in recording/play back apparatus.

The starting point is a substrate disc 1, which is typically 1.2 mm thick, 300 mm diameter with a central hole and made of low thermal conductivity plastics or glass, e.g. a methacrylate in the former case, a soda glass in the latter case.

This substrate is coated with layer 2 of an electrically conducting (typically 5 ohms per square), transparent (typical optical density of 0.1 at ca. 850 nm) coating, typically indium tin oxide. The next layer 4 is an oxide bronze thin film material, for example potassium molybdenum oxide $K_{0.2}MoO_3$. This material has a peak in its absorption coefficient corresponding to the above laser radiation ($\alpha = 4 \times 10^4$ cm$^{-1}$) which makes it particularly efficient, but the peak for tungsten bronzes is also quite close to this value. A film of typically 300 nm thickness in double traverse of light with the above value of $\alpha$ will have an optical density of unity, and contains about $3.3 \times 10^{16}$ K atoms per square cm. There is a thin film insulating layer 3 e.g. $MgF_2$ or $SiO_2$ on either side of the active stack in order to provide the necessary electrical insulation and to facilitate the sealing of this stack. Layer 5 is transparent potassium ion conducting electrolyte typically, polypropylene oxide - $KCF_3SO_3$ having a ratio of 4.5 oxygen atoms of the polymer to one potassium atom. The layer thickness would typically be 500 nm; conductivity at 20° C., $3 \times 10^{-8}$ ohm$^{-1}$ cm$^{-1}$ and conductivity at 160° C., $1.5 \times 10^{-3}$ ohm$^{-1}$ cm$^{-1}$.

The next layer 6 is a layer of transitition metal oxide, which when it contains potassium or other host metal is significantly less absorbing in the near infra red than the layer 4. Thus $K_{0.2}V_2O_5$ would only be one quarter as absorbing as the corresponding $K_{0.2}MoO_3$ film at 870 nm (corresponding in having the same amount of potassium). There are also $K_{0.2}(V_2O_5/MoO_3)$ solid solutions in which the absorption of 870 nm radiation is even less. Layer 6 is typically 300 nm thick. The final thin film layer 7 is about 100 nm of aluminium. Contacts are shown schematically to the electrochemical electrochromic disc stack. Finally the whole disc stack is encapsulated in an over layer of clear polymer 8.

As shown schematically the disc is mounted for rotation on the spindle of an electric motor 10. A pair of brush contacts 11,12 supply the operating voltage to electrode layers 2,7 rspectively.

A laser 13 and a photodetector 14 are mounted by linear traverse means 15 below the disc so as to be able to scan along a radius thereof.

The mounting of the disc for rotation and the arrangement of the laser and detector for reading and writing the disc may be carried out in ways known in the art and need be described here only in general terms.

The operation of this write/erase video disc is as follows. To write: a d.c. potential is applied to the stack, the positive electrode is on the front layer 2 and the negative electrode is on layer 7. Nothing will happen while the system is unheated. The whole disc is raised to about 75° C., still no current flows. Laser pulses are applied whereupon local areas are raised further in temperature. While the local areas are above about 175° C., current flows, potassium atoms are transported from the high optical absorption layer 4 to the low optical absorption layer 6. While the laser pulse is only of about 100 ns duration the current flow will be several milliseconds in duration sufficient to expose the reflecting back aluminium electrode, layer 7. There is thus produced a set of reflecting holes in a sea of absorbing material. All the information may be erased by heating the disc to about 150° C. and reversing the polarity of the applied d.c. voltage. If only local areas are heated, only local erasure will occur.

The system works because the activation energy, ($\Delta E$) for diffusion (D) of potassium in $MoO_3$ is about 1.5 eV and D at room temperature is about $10^{-22}$ cm$^2$ sec$^{-1}$. Thus when the temperature is $\geq 175°$ C., the D is $\geq 2.5 \times 10^{-14}$ and rapid electrochemical write/erase of the fine grained electrochromic host material becomes possible. The applied potential would be typically 10 volts. Also another important aspect of the working principles is that the local area be above about 175° C. for several milliseconds. The materials of construction determine the time over which the pulsed area remains above a certain temperature. Thus, the rise in temperature $\Delta T$ due to the laser pulse is given by:

$$\frac{FT_o}{3.54 \, (KCt)^{\frac{1}{2}}}$$

where F is the laser flux density, C is the heat capacity per unit volume, K is the thermal conductivity, $T_o$ is the time of duration of the laser pulse and t is the time at which we wish to know the value of $\Delta T$. As an example, supposing a 30 m Watt laser focused down to a 1 micron spot, then F is 3M watt cm$^{-2}$: supposing an effective thermal conductivity of $1 \times 10^{-4}$ J cm$^{-1}$ sec$^{1}$ °C.$^{-1}$, if To is 120 ns:

$$\Delta T = \frac{3 \times 10^6 \times 1.2 \times 10^{-7}}{3.54(2 \times 10^{-4})^{\frac{1}{2}}} t^{-\frac{1}{2}}$$

$$= 7.2 \, t^{-\frac{1}{2}}$$

so that at $5 \times 10^{-3}$ sec, $\Delta T = 102°$ C. With a 75° C. ambient, this gives a temperature at 5 milliseconds of 177° C., which is sufficient for the purpose.

Although described herein with reference to discs for storing audio/visual data, the invention is equally applicable to recording devices for other data, such as computer data compared to magnetic data storage discs, the invention can provide higher data density and a more physically robust system. Furthermore apparatus according to the invention can be employed in conjunction with recording devices other than discs and data can be written as legible visible indicia as well as in microscopic encoded form.

I claim:

1. An electrochromic data recording device comprising means defining an axis of rotation and a data recording portion surrounding the said axis characterised in that the device further comprises at least one electrochromic zone (4) in said recording portion and means (2,5,6,7) for selectively supplying to and withdrawing from said zone guest atoms which produce an optical change in said zone, which means is substantially inoperable at a first temperature but is operable at a temperature elevated with respect to said first temperature.

2. An electrochromic device according to claim 1 further characterised in that the device comprises
a first electrode (2) comprising a layer of a transparent electrically conducting material,
a layer of an electrochromic material (4) comprising a metal-sensitive compound which is capable of dissolving metal atoms and which changes optical density at a light frequency in so doing,
a layer of solid electrolyte (5), the solid electrolyte being a fast ion conductor in which a fast ion is an ion of the metal which dissolves in the metal-sensitive compound to change the optical density thereof, the layer of metal-sensitive compound being in contact with the first electrode and being in contact with the fast ion conductor, and
a second electrode (6,7), the second electrode being in contact with the said fast ion conductor and being capable of providing and accepting ions the same as the said fast ions of the fast ion conductor, in which the mobility of the fast ions or corresponding atoms in at least one of the electrolyte, the second electrode or the electrochromic layer, is temperature dependent, there being substantially no mobility at room temperature but the mobility increasing substantially with increase of temperature, whereby the device may be written into or erased by application of a potential difference across the two electrodes at a substantially raised temperature, the display being stable and non-changeable by application of similar potential differences at room temperature.

3. An electrochromic device according to claim 1, further characterised in that the device comprises
a first electrode (2) comprising a layer of a transparent electrically conducting material,
a layer of an electrochromic material (4) comprising a metal-sensitive compound which is capable of dissolving metal atoms and which changes optical density at a light frequency in so doing,
a layer of a solid electrolyte (5), the solid electrolyte being a fast ion conductor in which a fast ion is an ion of the metal which dissolves in the metal-sensitive compound to change the optical density thereof, and the layer of metal-sensitive compound being in contact with the first electrode and being in contact with the fast ion conductor, and
a second electrode (6,7), the second electrode being in contact with the said fast ion conductor and being capable of providing and accepting ions the same as the said fast ions of the fast ion conductor, in which the solid electrolyte is substantially non-conductive at room temperature but is readily conductive of the said fast ions at increased temperature, whereby data may be written into or erased from the device by application of a potential difference across the two electrodes at a substantially raised temperature, the display being stable and non-changeable by application of similar potential differences at room temperature.

4. A device according to claim 3, further characterised in that the rate of diffusion of the said metal atoms into or out of the electrochromic material (4) is low at room temperature but is substantially increased at raised temperatures.

5. A device according to any one of claims 2 to 4, further characterised in that the mobility of at least one of the atoms or ions in the device is sufficiently increased to allow writing and erasing of information at a temperature of 110° C. or above.

6. A device according to claim 2 further characterised in that the said second electrode (6,7) comprises a layer (6) of a material comprising a metal-sensitive compound, which is capable of dissolving the same metal atoms as the first mentioned electrochromic layer (4).

7. A device according to claim 6, further characterised in that the material of the second electrode (6) changes optical density at said frequency in response to said metal atoms, thus constituting a second electrochromic layer, the said solid electrolyte layer (5) being substantially transparent, and the two electrochromic layers (4,6) being of different thickness and such that the same quantity of guest atoms in the thicker layer produces a higher optical density at said frequency and in the thinner layer produces a lesser optical density at said frequency, whereby when the device is heated and appropriate potentials are applied, metal atoms can be transferred from one electrochromic layer to the other through the solid electrolyte so as to produce either a greater or lesser optical density at said frequency in the device.

8. A device according to claim 3, further characterised in that the, or each, electrochromic material is an oxide bronze of a transition material in its highest oxidation state.

9. A device according to claim 6, further characterised in that the metal-sensitive compound is tungsten oxide ($WO_3$), molybdenum oxide ($MoO_3$), vanadium oxide ($V_2O_5$), iridium oxide ($IrO_2$) and niobium oxide ($Nb_2O_5$), or a solid solution of two or more thereof.

10. A device according to claim 2, further characterised in that the said second electrode (6,7) comprises a layer (6) of tungsten bronze of the general formula $M_xWO_3$ where M is lithium, sodium or potassium, and x has a value between 0.05 and 0.5.

11. A device according to claim 6, further characterised in that the material of the second electrode (6,7) comprises a layer (6) of an oxide bronze which at least in thin layers undergoes no substantial change in optical density at a recording light frequency on a substantial change in the quantity of said metal atoms dissolved therein.

12. A device as claimed in claim 11 further characterised in that the said oxide bronze is based on $V_2O_5$ or a solid solution of $MoO_3$ and $V_2O_5$.

13. A device according to claim 12, further characterised in that the said oxide bronze is a solid solution of $MoO_3$ and $V_2O_5$ in the ratio from 1:3 to 3:1.

14. A device according to claim 13, further characterised in that said ratio is from 1:2 to 2:1.

15. A device according to claim 14, further characterised in that said ratio is substantially 1:1.

16. A device according to claim 2, further characterised in that the said solid electrolyte (5) is a polymeric solid electrolyte containing an alkali metal.

17. A device according to claim 16, further characterised in that the said solid electrolyte comprises a combination of polyethylene oxide or polypropylene oxide with an alkali metal compound.

18. A device according to claim 2, further characterised in that the said fast ion is one of lithium, sodium or potassium.

19. A device according to claim 2, further characerised in that the said first electrode (2) and the said second electrode (6,7) each extend over a substantial data recording area of the device on which area information is to be written, and both electrodes are provided with electrical contact portions for applying a general electrical potential difference across the first electrochromic layer (4) and the solid electrolyte layer (5) over the whole display area of the device, the arrangement of the device being such that information can be written in operations at different locations within the said display area by localised heating of the device during application of the general potential difference over the whole display area.

20. A device according to claim 2, further characterised in that the device is a disc.

21. A method of writing a data recording device by subjecting regions on said device to a laser beam to heat the device locally to alter the optical properties thereof characterised in that the device comprises at least one electrochromic zone and means responsive to applied electrical potential for supplying to and withdrawing from said zone guest atoms which produce an optical change in said zone, which means is substantially inoperable at a first temperature but is operable at a temperature elevated with respect to the first temperature, and said method comprises applying an electrical potential to said device tending to supply guest atoms to or withdraw guest atoms from said zone whilst said device as a whole is at a temperature such that the said means is not operable, whilst subjecting regions on said device to the laser beam to heat the device locally at said regions to render said means locally operable to bring about a change in guest atom content of the electrochromic zone in response to said applied potential.

* * * * *